(12) United States Patent
Hou

(10) Patent No.: US 8,909,989 B2
(45) Date of Patent: Dec. 9, 2014

(54) METHOD FOR OUTPUTTING POWER-ON SELF TEST INFORMATION, VIRTUAL MACHINE MANAGER, AND PROCESSOR

(71) Applicant: Huawei Technologies Co., Ltd., Shenzhen (CN)

(72) Inventor: Guoliang Hou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 13/715,290

(22) Filed: Dec. 14, 2012

(65) Prior Publication Data

US 2013/0132776 A1    May 23, 2013

Related U.S. Application Data

(63) Continuation of application No. PCT/CN2012/078078, filed on Jul. 3, 2012.

(30) Foreign Application Priority Data

Nov. 21, 2011  (CN) .......................... 2011 1 0370963

(51) Int. Cl.
   *G06F 11/00* (2006.01)
   *G06F 11/22* (2006.01)

(52) U.S. Cl.
   CPC .................................. *G06F 11/2284* (2013.01)
   USPC .......................................................... 714/36

(58) Field of Classification Search
   CPC .............................. G06F 9/4401; G06F 9/4403
   See application file for complete search history.

(56) References Cited

U.S. PATENT DOCUMENTS

| | | | | |
|---|---|---|---|---|
| 6,404,430 | B1 * | 6/2002 | Kawamura et al. | 345/427 |
| 8,365,297 | B1 * | 1/2013 | Parshin et al. | 726/26 |
| 2006/0212609 | A1 * | 9/2006 | Zimmer et al. | 710/14 |
| 2006/0218387 | A1 | 9/2006 | Fu et al. | |

FOREIGN PATENT DOCUMENTS

| | | |
|---|---|---|
| CN | 1831701 A | 9/2006 |
| CN | 2852230 Y | 12/2006 |
| CN | 101165696 A | 4/2008 |
| CN | 101414335 A | 4/2009 |
| CN | 101526901 A | 9/2009 |
| CN | 102521105 A | 6/2012 |

OTHER PUBLICATIONS

International Search Report issued in corresponding PCT Patent Application No. PCT/CN2012/078078, mailed Sep. 27, 2012.

* cited by examiner

*Primary Examiner* — Christopher McCarthy
(74) *Attorney, Agent, or Firm* — Brinks Gilson & Lione

(57) ABSTRACT

The present disclosure provides a method for outputting power-on self test information, a virtual machine manager, and a processor. The method includes: receiving trigger information generated by a BIOS program when the BIOS program runs a predefined virtual mode trigger instruction, starting, by a virtual machine manager, the virtual machine manager and monitoring a processor, where the processor is a processor that enters a virtual mode after receiving the trigger information of the BIOS program; when detecting that the processor generates an exit instruction, obtaining power-on self test information after the BIOS program performs a power-on self test operation, and outputting the power-on self test information to a serial port. Power-on self test information may be output without using a motherboard diagnostic card, so that device resources are saved. In addition, the operation is simple, and no human control operation is required.

13 Claims, 4 Drawing Sheets

METHOD FOR OUTPUTTING POWER-ON SELF TEST INFORMATION, VIRTUAL MACHINE MANAGER, AND PROCESSOR

CROSS-REFERENCE TO RELATED APPLICATIONS

This application is a continuation of International Application No. PCT/CN2012/078078, filed on Jul. 3, 2012, which claims priority to Chinese Patent Application No. 201110370963.7, filed on Nov. 21, 2011, both of which are hereby incorporated by reference in their entireties.

FIELD

The present disclosure relates to the field of computer technologies, and in particular, to a method and a system for outputting power-on self test information.

BACKGROUND

A BIOS (Basic Input Output System, basic input output system) program is a set of programs permanently stored in the motherboard memory chip of a computer, and includes the most important basic input output programs, system setting information, power-on self test program, system boot program of the computer, and so on, and its main function is to provide the lowest-layer and most direct hardware setting and control for the computer.

POST (Power-On Self Test, power-on self test) is a function set by the BIOS program, and refers to a process of performing a self test for each hardware device in a system by running the BIOS program when a computer device is powered on and started, including the test for the CPU, memory, motherboard, storage device, floppy and hard disk subsystems, and so on; if the test result is normal, the operating system is booted, and if a hardware device is faulty, the operating system cannot be started. The power-on self test information refers to the test result in the POST process, including information such as hardware type and version, and according to the power-on self test information, the location of the fault may be determined.

To implement fault handling, the power-on self test information needs to be output to determine the location of the device fault according to the power-on self test information. The conventional method for outputting power-on self test information usually uses a motherboard diagnostic card to display all power-on self test information in the form of codes when the BIOS program performs a power-on self test.

In the actual work, first the motherboard diagnostic card is inserted into the PCI or SAI slot of the motherboard, and after the computer is powered on and started, the BIOS program performs a power-on self test operation to test the hardware devices one by one, and writes hardware codes to port 80 when performing a test operation, where the port 80 is an IO port with a fixed address for outputting BIOS running state information, and the hardware codes represent different power-on self test information. The motherboard diagnostic card reads the hardware codes written in the port 80, and displays the hardware codes through a nixie tube and LED display on the motherboard diagnostic card. If a test is successful, the BIOS program continues to write a next hardware code to the port 80 until the test is completed. If the test is not successful, it indicates that a hardware device is faulty. In this case, the BIOS program stops the test, and the codes currently displayed by the motherboard diagnostic card do not change, and the location of the fault is known according to the currently displayed codes.

As can be seen from the above process, the conventional method for outputting power-on self test information requires a motherboard diagnostic card to output power-on self test information, therefore, device resources are increased, and it is inconvenient to use the motherboard diagnostic card because the motherboard diagnostic card needs to be inserted into the motherboard and it is necessary to open the chassis where the motherboard is located, making the operation troublesome.

SUMMARY

In view of this, embodiments of the present disclosure provides a method for outputting power-on self test information, a virtual machine manager, and a processor, which solve the problems of waste of device resources and troublesome operations caused by the conventional method for outputting power-on self test information.

To achieve the preceding objective, the present disclosure provides the following solutions:

In one aspect, the present disclosure provides a method for outputting power-on self test information, where the method includes: receiving trigger information generated by a BIOS program when the BIOS program runs a predefined virtual mode trigger instruction; starting, by a virtual machine manager, the virtual machine manager, and monitoring a processor, where the trigger information triggers the processor to enter a virtual mode; when detecting that the processor generates an exit instruction, obtaining power-on self test information after the BIOS program performs a power-on self test operation, where the exit instruction is generated after the processor determines that the power-on self test operation performed by the BIOS program meets a predefined trigger event; and outputting the power-on self test information to a serial port.

In another aspect, the present disclosure provides a method for outputting power-on self test information, where the method includes: after receiving trigger information generated by a BIOS program when the BIOS program runs a predefined virtual mode trigger instruction, entering, by a processor, a virtual mode; determining, by the processor, whether a power-on self test operation performed by the BIOS program meets a predefined trigger event; and if so, generating an exit instruction, where the exit instruction is used to instruct a virtual machine manager to obtain power-on self test information and output the power-on self test information to a serial port.

In still another aspect, the present disclosure provides a virtual machine manager, including: a starting module, configured to start the virtual machine manager when receiving trigger information generated by a BIOS program when the BIOS program runs a predefined virtual mode trigger instruction; a monitoring module, configured to monitor whether a processor entering a virtual mode generates an exit instruction, where the exit instruction is generated when the processor determines that a power-on self test operation performed by the BIOS program meets a predefined trigger event; an obtaining module, configured to: when a monitoring result of the monitoring module is yes, obtain power-on self test information after the BIOS program performs the power-on self test operation; and an outputting module, configured to output the power-on self test information to a serial port.

In still another aspect, the present disclosure provides a processor, including: a virtual mode starting module, configured to start a virtual mode when receiving trigger information generated by a BIOS program when the BIOS program runs a predefined virtual mode trigger instruction; a determining module, configured to determine whether a power-on self test operation performed by the BIOS program meets a predefined trigger event; and an instruction generating module, configured to generate an exit instruction if a judgment result of the determining module is yes, where the exit instruction is used to instruct a virtual machine manager to obtain power-on self test information and output the power-on self test information to a serial port.

As can be seen from above solutions, compared with the prior art, the present disclosure provides a method for outputting power-on self test information, a virtual machine manager, and a processor. A BIOS program runs a predefined virtual mode trigger instruction to generate trigger information; the processor enters a virtual mode after receiving the trigger information; the virtual machine manager gets started after receiving the trigger information, and monitors the processor entering the virtual mode. The processor entering the virtual mode generates an exit instruction when determining that the power-on self test operation performed by the BIOS program meets a predefined trigger event. When detecting the exit instruction, the virtual machine manager obtains power-on self test information and outputs it to a serial port, so that a serial port terminal obtains and displays the power-on self test information. With the present disclosure, power-on self test information may be obtained and output through the virtual machine manager without using a motherboard diagnostic card, so that device resources are saved and that the operation is simple.

BRIEF DESCRIPTION OF THE DRAWINGS

To illustrate the solutions in the embodiments of the present disclosure or in the prior art more clearly, the following briefly describes the accompanying drawings required for describing the embodiments or the prior art. Apparently, the accompanying drawings in the following description merely show some embodiments of the present disclosure, and persons of ordinary skill in the art can derive other drawings from these accompanying drawings without creative efforts.

DETAILED DESCRIPTION OF THE EMBODIMENTS

The following clearly and completely describes the solutions according to the embodiments of the present disclosure with reference to the accompanying drawings in the embodiments of the present disclosure. Apparently, the embodiments in the following description are merely a part rather than all of the embodiments of the present disclosure. All other embodiments obtained by persons of ordinary skill in the art based on the embodiments of the present disclosure without creative efforts shall fall within the protection scope of the present disclosure.

One of the main ideas of the present disclosure may include: A BIOS program runs a predefined virtual mode trigger instruction to generate trigger information to trigger a processor to enter a virtual mode and trigger a virtual machine manager to get started, where the BIOS program may serve as an application program that runs on a virtual machine; the processor generates an exit instruction when determining that the power-on self test operation performed by the BIOS program meets a predefined trigger event; and when detecting that the processor generates the exit instruction, the virtual machine manager obtains the power-on self test information after the BIOS program performs a power-on self test operation, and outputs the power-on self test information to a serial port. According to the embodiments of the present disclosure, power-on self test information may be output without using a motherboard diagnostic card, so that device resources are saved. In addition, the operation is simple, and no human control operation is required. Meanwhile, the serial port finally outputs the data, so that it is convenient to obtain information.

The implementation solutions of the present disclosure are hereinafter described in detail with reference to the accompanying drawings.

Figure 1:
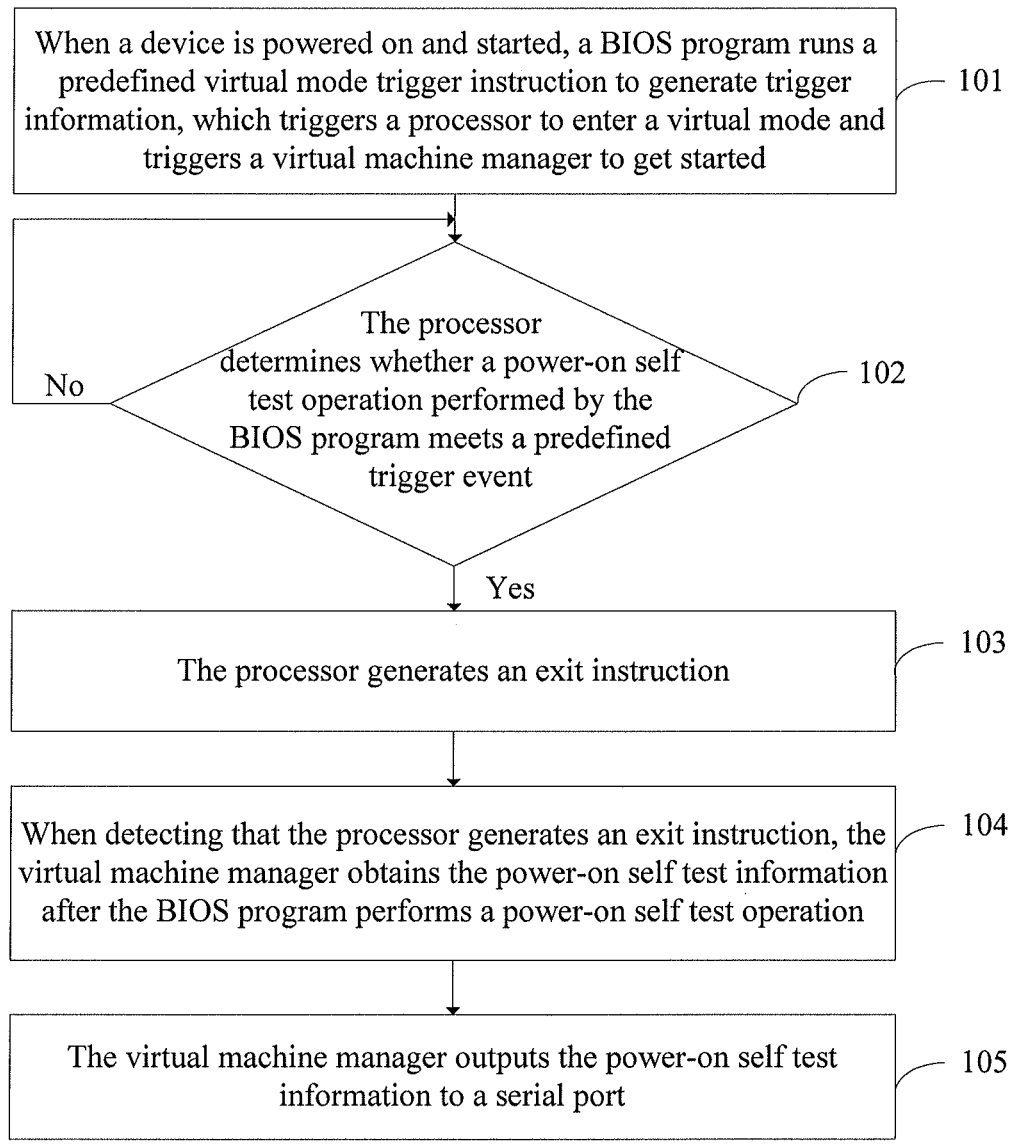
FIG. 1 is a flowchart of a method for outputting power-on self test information according to Embodiment 1 of the present disclosure.

FIG. 1 is a flowchart of a method for outputting power-on self test information according to Embodiment 1 of the present disclosure. The method may include:

Step 101: When a device is powered on and started, a BIOS program runs a predefined virtual mode trigger instruction to generate trigger information, which triggers a processor to enter a virtual mode and triggers a virtual machine manager to get started.

The embodiment of the present disclosure is a solution for outputting power-on self test information based on a VT (Vanderpool Technology, hardware-assisted virtualization technology) technology. Before this step is described, first the VT-related technology is described in brief.

The processor should be a processor that may support the VT technology and can implement hardware virtualization. The processor entering the virtual mode may support running of multiple virtual machines. A virtual machine is an abstract and simulation of a real computing environment, and each virtual machine has its own separate virtual operating system, but the virtual operating system runs on a physical processor in essence.

The virtual machine manager is software that is applied in the VT technology and capable of controlling the processor and other hardware resources. The virtual machine is suspended when it meets a trigger event during the running, and the virtual machine manager runs and performs the corresponding control operation.

Taking a processor that supports a VT-X technology as an example, the processor entering the virtual mode includes two work modes: a root mode and a non-root mode, and the two work modes are VMX (Virtual-Machine Extension, virtual-machine extension mode). The virtual machine runs in the non-root mode, and the virtual machine manager runs in the root mode. Switching of the two work modes may be implemented through the corresponding instruction switching. In a work mode, the currently running system or software occupies resources of the processor exclusively.

Running the virtual mode trigger instruction, namely, a VMXON instruction in the VT-X technology, may trigger the processor to enter a virtual mode, and at the same time, may trigger the virtual machine manager to get started.

In the steps of this embodiment, first the BIOS program is preset, and a virtual mode trigger instruction is added to the BIOS program, where the instruction may be a VMXON instruction. When the device is powered on and started, the BIOS program first runs, and the virtual mode trigger instruction is executed after completion of basic initialization. Trigger information is generated by executing the virtual mode trigger instruction, where the trigger information is used to trigger the processor to enter the virtual mode and at the same time trigger the virtual machine manager to get started. To be specific, after receiving the trigger information of the BIOS program, the processor starts the virtual mode; the processor first enters the non-root mode, and the virtual machine runs, and the currently running BIOS program may serve as an application program running on the current virtual machine; after receiving the trigger information of the BIOS program, the virtual machine manager gets started, and can monitor the processor entering the virtual mode.

Step 102: The processor determines whether a power-on self test operation performed by the BIOS program meets a predefined trigger event, and if so, goes to step 103.

In the VT-X technology, the trigger event is a trigger event triggering the processor to enter the root mode from the non-root mode; entering the root mode from the non-root mode indicates that the virtual machine exits and is suspended and that the program running on the virtual machine stops running temporarily. Therefore, the predefined trigger event is a trigger event that may trigger the virtual machine to exit.

The predefined trigger event is set in the control policy of the VMCS (Virtual-Machine Control data Structure, virtual-machine control data structure). The VMCS is a data structure used for storing the state information and exit control policy of the virtual machine and virtual machine manager. Each virtual machine corresponds to a suite of VMCSs. When the virtual machine runs, the processor first reads the exit control policy set in the VMCS, and determines, according to the exit control policy, whether the currently running program meets the predefined trigger event.

In this embodiment, the trigger event is set beforehand, so that the BIOS program may trigger the virtual machine to exit when performing the power-on self test operation, and the virtual machine manager processes the trigger event.

After completing the virtualization operation, the BIOS program can perform the power-on self test operation and test each hardware device.

At the initial stage of BIOS design, because no direct display device is available, usually the running state information of the BIOS is output to the IO port whose address is 80H, namely, port 80. In the power-on self test process, when a test is performed, that is, when a hardware device is tested, the BIOS program may write power-on self test information to port 80, where the power-on self test information may include the type, size, and capacity of the hardware. According to different BIOS versions, the power-on self test information may be represented by different hardware codes, where the hardware codes are hexadecimal data, and which hardware is faulty is known according to the finally output hardware code.

There may be many trigger events for triggering the virtual machine to exit, such as a pin signal, a processor exception, a page exception, and an IO port access. As can be seen from above, when the BIOS program performs a power-on self test operation, the BIOS program writes data to the IO port, that is, writes power-on self test information to port 80, and therefore, the predefined trigger event is: writing power-on self test information to port 80.

When the processor determines that the BIOS program writes power-on self test information to port 80, that is, determines an read operation is performed for port 80, because only the BIOS program runs in the power-on self test operation process, it may be determined that the power-on self test operation performed by the BIOS program meets the predefined trigger event.

Step 103: The processor generates an exit instruction.

After it is determined that the power-on self test operation performed by the BIOS program meets the predefined trigger event, the virtual machine is suspended, and the BIOS program running on the virtual machine stops running temporarily, and the processor generates an exit instruction.

Step 104: When detecting that the processor generates an exit instruction, the virtual machine manager obtains the power-on self test information after the BIOS program performs a power-on self test operation.

When triggered to get started, the virtual machine manager monitors the processor, and can perform the corresponding processing operation for the trigger event after detecting that the processor generates the exit instruction.

In this embodiment, the trigger event for triggering the processor to generate an exit instruction may be that the BIOS program writes power-on self test information to port 80. Therefore, the virtual machine manager may be configured to obtain power-on self test information after the BIOS program performs a power-on self test operation, that is, the virtual machine manager obtains the power-on self test information from port 80.

The power-on self test information may be represented by different hardware codes, where the power-on self test information represented by the hardware codes varies according to different BIOS versions.

Step 105: The virtual machine manager outputs the power-on self test information to a serial port.

The virtual machine manager outputs the power-on self test information to the serial port after obtaining the power-on self test information, and may also output the power-on self test information from the serial port. The serial port is a serial interface, and is an IO port of a computer. After being output to the serial port, the power-on self test information may be displayed through a serial port terminal, where the serial port terminal may be a display, a printer, a projector, and so on.

In addition, because the power-on self test information is usually hexadecimal hardware codes, to avoid abnormal displaying of the data output from the serial port, the power-on self test information may be first converted into serial port data, and then the serial port data after conversion is output to the serial port. The serial port data may be ASCII codes.

The outputting of the serial port data to the serial port is outputting the serial port data to the serial interface of the corresponding serial port address according to the serial port address. The serial port address may be a fixed serial port address, for example, 03f8H-03ffH.

In this embodiment, running the virtual mode trigger instruction predefined in the BIOS program triggers the processor to enter the virtual mode and triggers the virtual machine manager to get started. The processor entering the virtual mode generates an exit instruction after determining, according to a predefined trigger event, that the power-on self test operation performed by the BIOS program meets the predefined trigger event. When detecting that the processor generates an exit instruction, the virtual machine manager obtains power-on self test information of the BIOS program, and outputs the power-on self test information to a serial port. Power-on self test information may be obtained and output through the virtual machine manager in the virtualization technology without using a motherboard diagnostic card, so that hardware device resources are saved.

It should be noted that when performing a power-on self test operation and when testing a hardware device, the BIOS program writes the power-on self test information corresponding to the hardware device to port 80; the processor generates an exit instruction; the virtual machine manager obtains the power-on self test information and outputs it to the serial port. Therefore, the operations of step 102 to step 105 in this embodiment are performed cyclically; after power-on self test information is output at a time, the virtual machine manager triggers the previously suspended virtual machine to run again; therefore, the BIOS program continues to perform a power-on self test operation until the power-on self test operation performed by the BIOS program is completed.

In the VT-X technology, the triggering the previously suspended virtual machine to run again is implemented through mode switching of the processor, and is: After determining that the virtual machine manager outputs the power-on self test information to the serial port, the processor reenters the non-root mode from the root mode, and executes the corresponding login instruction, so that the virtual machine runs again, and that the BIOS program running on the virtual machine can continue to perform a power-on self test operation.

After completion of the power-on self test operation, the BIOS program may also run the predefined virtual mode exit instruction to trigger the processor to exit the virtual mode. In this way, the processor can normally start its own operating system according to the normal procedure.

Figure 2:
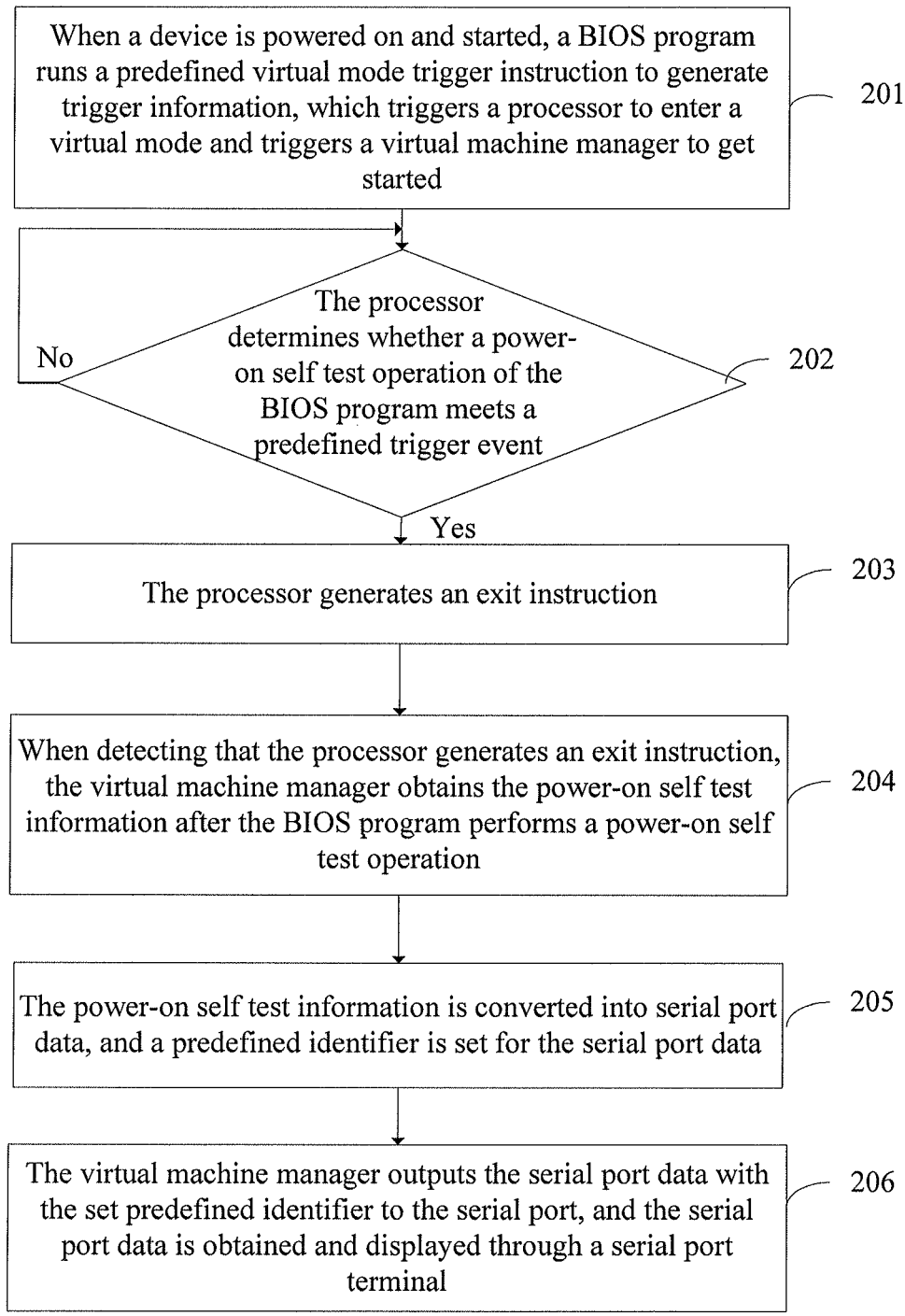
FIG. 2 is a flowchart of a method for outputting power-on self test information according to Embodiment 2 of the present disclosure.

FIG. 2 is a flowchart of a method for outputting power-on self test information according to embodiment 2 of the present disclosure. The method may include:

Step 201: When a device is powered on and started, a BIOS program runs a predefined virtual mode trigger instruction to generate trigger information, which triggers a processor to enter a virtual mode and triggers a virtual machine manager to get started.

Step 202: The processor determines whether the BIOS program writes power-on self test information to port 80, and if so, goes to step 103.

The processor determines whether the BIOS program writes the power-on self test information to port 80, that is, the processor determines whether port 80 is accessed in the BIOS execution process.

Step 203: The processor generates an exit instruction.

When it is determined that the BIOS program writes the power-on self test information to port 80, it indicates that the power-on self test operation performed by the BIOS program meets a predefined trigger event, and an exit instruction is generated. The currently running virtual machine is suspended and stops running temporarily.

Step 204: When detecting that the processor generates an exit instruction, the virtual machine manager obtains the power-on self test information from port 80.

After the virtual machine exits, the virtual machine manager processes the trigger event, and reads the power-on self test information from port 80.

In the actual application, because there are many trigger events for triggering the virtual machine to exit, the processor may also store a mapping relationship between each exit instruction and the trigger event into the VMCS; the virtual machine manager detects that the processor generates an exit instruction, obtains the mapping relationship, finds the trigger event corresponding to the exit instruction, and performs different operations according to different trigger events.

The trigger event in this embodiment is writing power-on self test information to port 80, that is, accessing port 80. Therefore, when the power-on self test operation performed by the BIOS program executes a power-on action, the processor is triggered to generate an exit instruction. The virtual machine manager determines, according to the exit instruction, that the trigger event corresponding to the exit instruction is writing power-on self test information to port 80, that is, reading the power-on self test information from port 80.

Step 205: The power-on self test information is converted into serial port data, and a predefined identifier is set for the serial port data.

Because the hardware code written to port 80 is hexadecimal data, to implement normal outputting of the self test information from the serial port, the hexadecimal data is first converted into serial port data, into an ASCII code. At the same time, because the data output from the serial port includes not only the power-on self test information, but also other serial port data, to distinguish which data is the data output by the power-on self test, namely, the data output from port 80, in the embodiment of the present disclosure, a predefined identifier may be added to the serial port data after conversion, where the predefined identifier may uniquely identify that the output data is the data obtained in the power-on self test, and may be identifier marks such as a digital identifier, an icon identifier, and text representation. For example, the data output from port 80 is 0012H; to distinguish the data from other data output from the serial port, the data with the predefined identifier is 80:0012H. 80 represents a predefined identifier. Therefore, in the data obtained from the serial port, by viewing which data has an identifier 80, power-on self test data is known.

Step 206: The virtual machine manager outputs the serial port data with the set predefined identifier to the serial port, and the serial port data is obtained and displayed through a serial port terminal.

According to the serial port address, the finally formed serial port data is output to the serial port; in this way, the serial port terminal can obtain and display the data, where the serial port terminal may be a projector, a printer, a display, and so on; the process of obtaining and displaying data by the serial port terminal is the same as the prior art, and is not further described herein.

In this embodiment, the power-on self test information generated in each test operation performed by the BIOS program can be output through the serial port, and the data displayed by the serial port terminal may include test results of all hardware, which avoids the problem of displaying only one piece of power-on self test information by the LED display. Therefore, debugging can be performed according to the self test information. If a device is faulty, which hardware device is faulty may be determined by querying the meaning of the information represented by the last piece of data obtained by the serial port terminal.

In addition, to adapt to the conventional power-on self test information query manual, the data output from the serial port may continue to be converted, and then the serial port data is converted into other identifiable data to facilitate the query of self test information.

It should be noted that the data output to the serial port may also be controlled by a super input/output chip to implement other conversions of serial port data and provide the data to the corresponding terminal device.

In this embodiment, the virtual machine manager converts the obtained power-on self test information into serial port data, and outputs the serial port data to the serial port after setting a predefined identifier, thereby ensuring normal outputting of information and facilitating the search of data finally displayed by the serial port terminal for the data output in the power-on self test operation.

In the embodiment of the present disclosure, the virtualization technology of the processor is used, and the virtual machine manager implements the functions of the motherboard diagnostic card. When the BIOS program performs a power-on self test operation, the BIOS program writes power-on self test information to port 80, that is, it accesses the IO port. Therefore, the trigger event is set to accessing port 80, that is, writing power-on self test information to port 80 is the trigger event in the present disclosure. After the processor determines that the power-on self test operation performed by the BIOS program meets the predefined trigger event, the currently running virtual machine is suspended, and the BIOS program running on the virtual machine stops running temporarily. The virtual machine manager runs, obtains power-on self test information, and outputs the information to the serial port. Because the virtual machine manager is a software system, and the virtual machine manager is arranged in all conventional computers supporting the virtualization technology, the present disclosure uses the virtual machine manager to implement outputting of power-on self test information without using a motherboard diagnostic card, thereby saving device resources.

Figure 3:
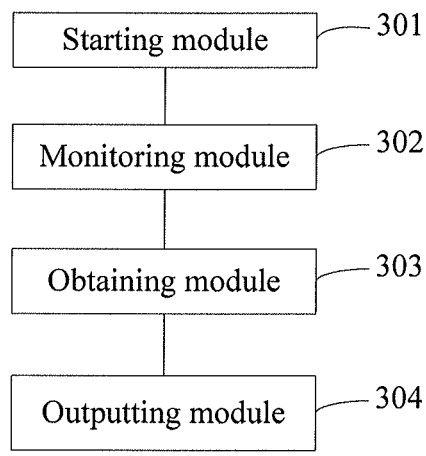
FIG. 3 is a schematic structural diagram of a virtual machine manager according to Embodiment 1 of the present disclosure.

The present disclosure further provides a virtual machine manager. FIG. 3 is a schematic structural diagram of a virtual machine manager according to Embodiment 1 of the present disclosure. The virtual machine manager may include:

A starting module 301 is configured to start the virtual machine manager when receiving trigger information generated by a BIOS program when the BIOS program runs a predefined virtual mode trigger instruction.

Trigger information is generated by the BIOS program when the BIOS program runs the predefined virtual mode trigger instruction. The trigger information may trigger the virtual machine manager to get started, and trigger the processor to enter the virtual mode; and the monitoring the processor is monitoring the processor entering the virtual mode.

A monitoring module 302 is configured to monitor whether the processor entering the virtual mode generates an exit instruction, where the exit instruction is generated when the processor determines that the power-on self test operation performed by the BIOS program meets a predefined trigger event.

After the BIOS program runs the predefined virtual mode trigger instruction, the processor enters the virtual mode. In the virtual mode, the BIOS program may serve as an application program running on the currently running virtual machine; when it is determined that the power-on self test operation performed by the BIOS program meets the predefined trigger event, and, when it is determined that the BIOS program writes power-on self test information to port 80, an exit instruction is generated.

After the virtual machine manager gets started, the monitoring module 302 monitors the processor, and determines whether the processor generates an exit instruction.

An obtaining module 303 is configured to: when a monitoring result of the monitoring module 302 is yes, obtain power-on self test information after the BIOS program performs the power-on self test operation.

After the monitoring module 302 detects that the processor generates an exit instruction, the obtaining module may process the predefined trigger event generating the exit instruction, where the predefined trigger event may be writing power-on self test information to port 80 in this embodiment. In the BIOS execution process, the data written to port 80 is also the power-on self test information; therefore, the obtaining module may obtain the power-on self test information from port 80.

An outputting module 304 is configured to output the power-on self test information to a serial port.

After the power-on self test information is obtained, the outputting module 304 outputs the power-on self test information to the serial port, and the power-on self test information is obtained and displayed through a serial port terminal.

The virtual machine manager in this embodiment can implement the functions of the motherboard diagnostic card and obtain and output the power-on self test information. In addition, the virtual machine manager in this embodiment outputs the power-on self test information to the serial port and displays the information through the serial port terminal, which can keep the self test information of each hardware device. The virtual machine manager is applied in the outputting of power-on self test information without using a motherboard diagnostic card, and the performed steps are simple and device resources may be saved.

Figure 4:
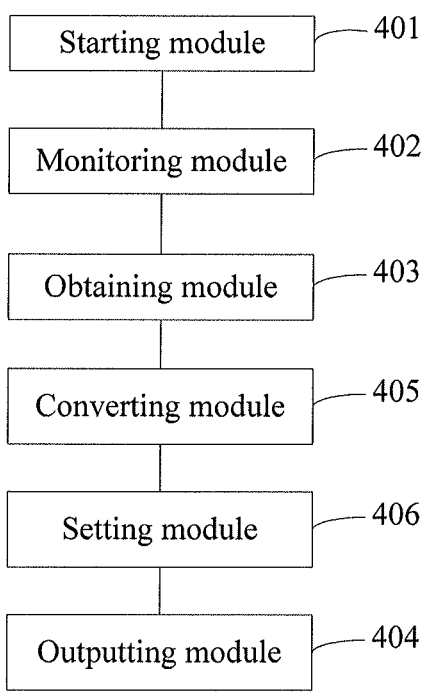
FIG. 4 is a schematic structural diagram of a virtual machine manager according to Embodiment 2 of the present disclosure.

FIG. 4 is a schematic structural diagram of a virtual machine manager according to Embodiment 2 of the present disclosure. The virtual machine manager may include a starting module 401, a monitoring module 402, an obtaining module 403, and an outputting module 404. The functions implemented by each module are disclosed in embodiment 1 of the virtual machine manager, and are not further described herein. In addition, the virtual machine manager further includes:

a converting module 405, configured to convert the power-on self test information into serial port data; and a setting module 406, configured to set a predefined identifier for the serial port data; where the outputting module 404 is configured to output the serial port data with the set predefined identifier to the serial port.

In this embodiment, the virtual machine manager converts the obtained power-on self test information into serial port data, and outputs the serial port data to the serial port after setting a predefined identifier, thereby ensuring normal outputting of information and facilitating the search of data finally displayed by the serial port terminal for the data output in the power-on self test operation.

Figure 5:
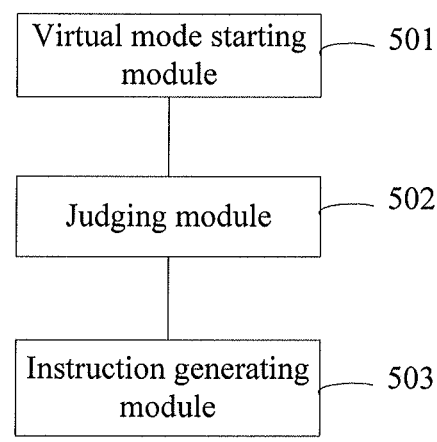
FIG. 5 is a schematic structural diagram of a processor according to an embodiment of the present disclosure.

The present disclosure further provides a processor; FIG. 5 is a schematic structural diagram of a processor according to an embodiment of the present disclosure. The processor may include:

A virtual mode starting module 501 is configured to start a virtual mode when receiving trigger information generated by a BIOS program when the BIOS program runs a predefined virtual mode trigger instruction.

Trigger information is generated by the BIOS program when the BIOS program runs the predefined virtual mode trigger instruction. The virtual mode starting module starts the virtual mode according to the trigger information, and the processor enters the virtual mode.

The processor starting the virtual mode may support running of multiple virtual machines. In this embodiment, the BIOS program may serve as an application program running on the currently running virtual machine.

A determining module 502 is configured to determine whether the power-on self test operation performed by the BIOS program meets a predefined trigger event.

The predefined trigger event is writing power-on self test information to port 80. When the device is powered on and started, in the BIOS execution process, the data written to port 80 is also the power-on self test information. Therefore, the determining module is configured to determine whether the BIOS program writes power-on self test information to port 80.

An instruction generating module 503 is configured to generate an exit instruction if a judgment result of the determining module 502 is yes, where the exit instruction is used to instruct a virtual machine manager to obtain power-on self test information and output the power-on self test information to a serial port.

The processor in the embodiment of the present disclosure is a processor that supports the VT technology and may implement hardware virtualization. After the processor supporting the VT technology enters the virtual mode, virtual machines based on different virtual operating systems may be constructed. Each virtual machine is controlled by the actual processor in essence. Setting a virtual mode trigger instruction in the BIOS triggers the processor to enter the virtual mode, that is, the BIOS program is used as an application program of the virtual machine. Because the BIOS program writes data to port 80 when performing a power-on self test operation, the processor entering the virtual mode can determine that the power-on self test operation performed by the BIOS program meets the predefined trigger event when determining, according to the predefined trigger event, that power-on self test information is written to port 80, and therefore generates an exit instruction. The exit instruction may instruct the virtual machine manager to obtain power-on self test information and output the information to the serial port.

All embodiments describe the present disclosure by using the progressive method. Each embodiment describes only the difference from other embodiments. For the similar parts among all embodiments, reference may be made to the relevant parts. The apparatus disclosed in the embodiment is related to the method disclosed in the embodiments, and is therefore outlined. For the associated part, reference may be made to the description in the method embodiments.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion". Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

For easy description, the preceding apparatuses are divided into a variety of modules according to functions for separate description. Of course, when implementing this disclosure, the functions of each of the modules can be implemented in a same or a plurality of hardware devices.

The preceding description disclosed in the embodiments allows a person skilled in the art to implement or use the present disclosure. Multiple modifications to these embodiments are apparent for a person skilled in the art. The general principle defined in the present disclosure may be implemented in other embodiments without departing from the spirit or scope of the present disclosure. Therefore, the present disclosure will not be limited to the embodiments described in the document but extends to the widest scope that complies with the principle and novelty disclosed in the document.

What is claimed is:

1. A method for outputting power-on self test information, comprising:

receiving trigger information generated by a basic input output system (BIOS) program when the BIOS program runs a predefined virtual mode trigger instruction;

starting, by a virtual machine manager, the virtual machine manager, and monitoring a processor, wherein the trigger information triggers the processor to enter a virtual mode;

when detecting that the processor generates an exit instruction, obtaining power-on self test information after the BIOS program performs a power-on self test operation, wherein the exit instruction is generated after the processor determines that the power-on self test operation performed by the BIOS program meets a predefined trigger event; and outputting the power-on self test information to a serial port.

2. The method according to claim 1, wherein outputting the power-on self test information to a serial port comprises:

converting the power-on self test information into serial port data, and outputting the serial port data to the serial port.

3. The method according to claim 2, wherein outputting the power-on self test information to a serial port comprises:

converting the power-on self test information into serial port data, and setting a predefined identifier for the serial port data; and outputting the serial port data with the set predefined identifier to the serial port.

4. The method according to claim 1, wherein: the exit instruction is generated after the processor entering the virtual mode determines that the power-on self test operation performed by the BIOS program meets the predefined trigger event when the processor determines that the BIOS program writes the power-on self test information to port 80; and obtaining the power-on self test information after the BIOS program performs a power-on self test operation comprises:

obtaining the power-on self test information from port 80.

5. The method according to claim 1, wherein the power-on self test information output to the serial port is obtained and displayed by a serial port terminal.

6. A method for outputting power-on self test information, comprising:

after receiving trigger information generated by a basic input output system (BIOS) program when the BIOS program runs a predefined virtual mode trigger instruction, entering, by a processor, a virtual mode;

determining, by the processor, whether a power-on self test operation performed by the BIOS program meets a predefined trigger event; and if so, generating an exit instruction, wherein the exit instruction is used to instruct a virtual machine manager to obtain power-on self test information and output the power-on self test information to a serial port.

7. The method according to claim 6, wherein the processor determines, in the following way, whether the power-on self test operation performed by the BIOS program meets the predefined trigger event:

the processor determines that the power-on self test operation performed by the BIOS program meets the predefined trigger event when the processor determines that the BIOS program writes the power-on self test information to port 80.

8. The method according to claim 6, wherein the trigger instruction is used to instruct the virtual machine manager to obtain the power-on self test information, convert the power-on self test information into serial port data, and output the serial port data to the serial port.

9. A virtual machine manager, comprising:
- a starting module, configured to start the virtual machine manager when receiving trigger information generated by a basic input output system (BIOS) program when the BIOS program runs a predefined virtual mode trigger instruction;
- a monitoring module, configured to monitor whether a processor entering a virtual mode generates an exit instruction, wherein the exit instruction is generated when the processor determines that a power-on self test operation performed by the BIOS program meets a predefined trigger event;
- an obtaining module, configured to: when a monitoring result of the monitoring module is yes, obtain power-on self test information after the BIOS program performs the power-on self test operation; and
- an outputting module, configured to output the power-on self test information to a serial port.

10. The virtual machine manager according to claim 9, further comprising:
- a converting module, configured to convert the power-on self test information into serial port data; wherein the outputting module is configured to output the serial port data to the serial port.

11. The virtual machine manager according to claim 10, further comprising:
- a setting module, configured to set a predefined identifier for the serial port data; wherein
- the outputting module is configured to output the serial port data with the set predefined identifier to the serial port.

12. A processor, comprising:
- a virtual mode starting module, configured to start a virtual mode when receiving trigger information generated by a basic input output system (BIOS) program when the BIOS program runs a predefined virtual mode trigger instruction;
- a determining module, configured to determine whether a power-on self test operation performed by the BIOS program meets a predefined trigger event; and
- an instruction generating module, configured to generate an exit instruction if a judgment result of the determining module is yes, wherein the exit instruction is used to instruct a virtual machine manager to obtain power-on self test information and output the power-on self test information to a serial port.

13. The processor according to claim 12 wherein the determining module is configured to determine whether the BIOS program writes power-on self test information to port 80.

* * * * *